United States Patent [19]

Carlsson

[11] Patent Number: 4,464,830
[45] Date of Patent: Aug. 14, 1984

[54] PROCESS FOR THE DISASSEMBLING OF SCRAP ALKALINE ELECTRIC STORAGE BATTERIES

[75] Inventor: Erik M. Carlsson, Oskarshamn, Sweden

[73] Assignee: SAB Nife AB, Landskrona, Sweden

[21] Appl. No.: 420,923

[22] Filed: Sep. 21, 1982

[30] Foreign Application Priority Data

Sep. 24, 1981 [SE] Sweden .................. 8105662

[51] Int. Cl.³ .............................. B23P 19/00
[52] U.S. Cl. .................... 29/763; 29/403.3; 29/426.1; 429/49
[58] Field of Search .............. 29/763, 403.1, 403.3, 29/426.1, 426.2, 426.3, 426.4, 426.5; 429/49

[56] References Cited

U.S. PATENT DOCUMENTS

| | | | |
|---|---|---|---|
| 1,446,882 | 2/1923 | Cox | 429/49 |
| 2,046,490 | 7/1936 | Schuirmann | 29/763 |
| 2,119,857 | 6/1938 | Eppensteiner | 29/763 |
| 2,250,490 | 7/1941 | Lormor | 429/49 |
| 2,736,952 | 3/1956 | Sibley | 29/763 |
| 3,137,930 | 6/1964 | Smith | 29/763 |
| 3,453,150 | 7/1969 | Murph et al. | 29/763 |
| 4,043,019 | 8/1977 | Schröder | 29/403.3 |
| 4,058,886 | 11/1977 | Alvarez | 29/763 |
| 4,333,219 | 6/1982 | Ginatta | 29/763 |

FOREIGN PATENT DOCUMENTS 744101 10/1966 Canada .................. 29/403.1
366155 4/1974 Sweden .

OTHER PUBLICATIONS

Witte, O. A., The Automobile Storage Battery Its Care and Repair, C. J. Ollendorf Co., Chicago, Ill., Fourth Edition, 1930.

Primary Examiner—Howard N. Goldberg
Assistant Examiner—P. W. Echols
Attorney, Agent, or Firm—Laurence R. Brown

[57] ABSTRACT

A process for the disassembling of scrapped, i.e. worn out, damaged or in some other way unserviceable electrical storage batteries (10), in particular alkaline batteries, which consist of a prismatic cell container with sets of positive and negative plates, each secured to the next by means of a connecting strap, from which terminal posts project through a cover on the upper part of the cell container. After any free electrolyte has been emptied from the cell container, the materials making up the battery can be recovered.

This is done by removing the upper part of the cell container so as to produce an opening and by withdrawing the sets of plates (31) from the cell container through the opening by means of a mechanical device (20) at the same time as the container is gripped and held fast in a pre-determined position by means of clamping devices (33, 34). The sets of plates are then washed clean of any residual deposits and remaining electrolyte by means of a rinsing liquid (37), and independently mounted, moving, hook-shaped drawing devices (43, 44) are brought into engagement with the sets of negative plates (46) and with the sets of positive plates (45), whereupon the sets of plates are separated from each other (FIG. 2) by means of pneumatically or hydraulically powered devices (41, 42) fitted with moving hooks (43, 44) which engage with the connecting straps.

5 Claims, 3 Drawing Figures

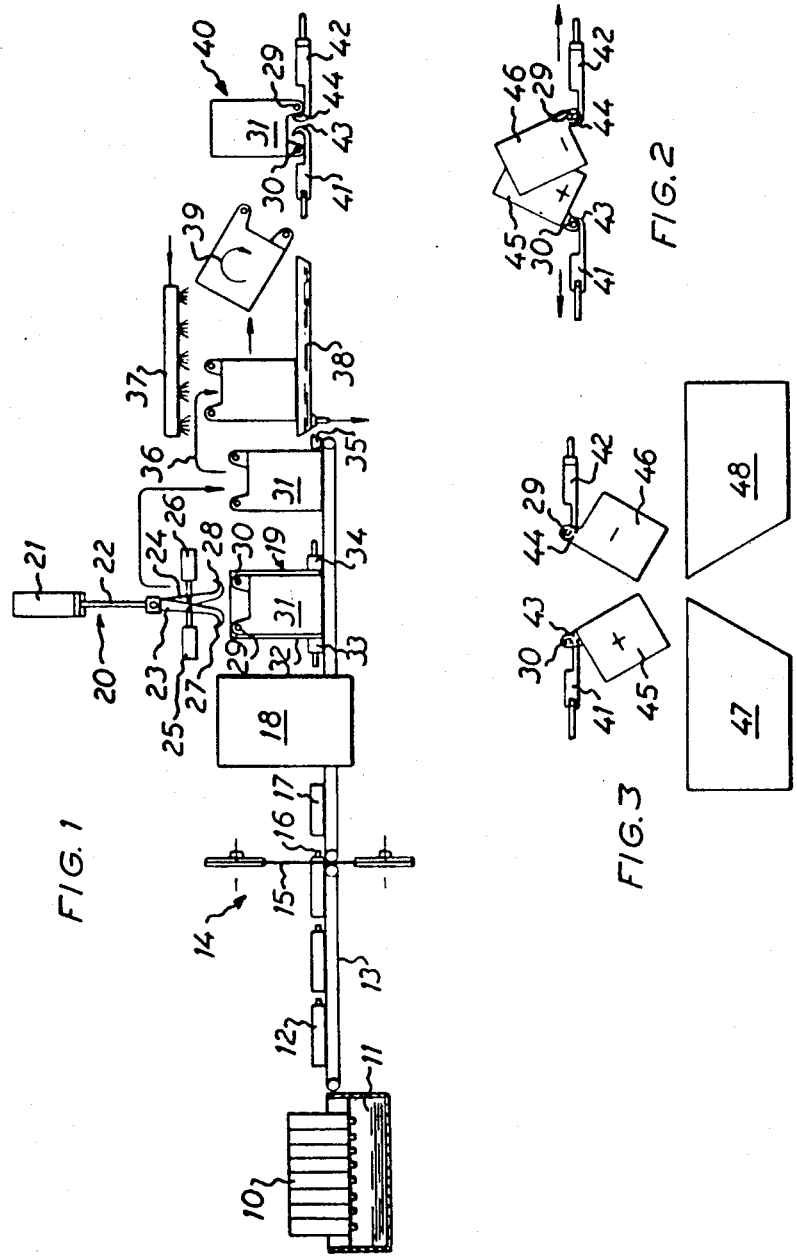

PROCESS FOR THE DISASSEMBLING OF SCRAP ALKALINE ELECTRIC STORAGE BATTERIES

TECHNICAL FIELD

The present invention relates to a process for the disassembling of scrapped, i.e. worn out, damaged or in some other way unserviceable electric storage batteries, in particular alkaline batteries, consisting of a prismatic cell container with sets of positive and negative plates, each of said sets of plates being secured by means of a connecting strap, from which a terminal post projects through a cover on the upper part of the cell container, for the purpose after having emptied any free electrolyte from the cell container of recovering the materials making up the battery.

BACKGROUND ART

A process of this kind has already been disclosed, for example, in German Patent Specification DE-A-30 38 351. This publication describes a process for the recovery of the material in a battery, in this case lead batteries for vehicles. The process involves removing the base of the battery container, and possibly also the top. The bases and the internal parts of the batteries, i.e. the electrode plates and the plates which secure the battery parts together, are removed by the effect of gravity. As it is difficult by means of this process to separate the internal parts of the battery, it has been proposed to cause the entire battery to vibrate in order to more certainly release the parts and make them fall out.

The process described in said German Patent Specification suffers from the disadvantage that its function is unreliable, even if vibration is applied, in addition to which the electrolyte runs out in an uncontrollable manner as the base of the battery container is removed. The process leaves both the positive and the negative sets of electrode plates in a single, unseparated unit, which also contains sludge and electrode deposits and residual electrolyte. This renders more difficult the subsequent handling involved in the recovery of the material making up the battery and results in contaminated scrap.

In the case of lead batteries, in which lead is the principal component of both the positive and the negative electrode plates, no actual separation of the sets of electrode plates is required as part of the process of recovering material making up the battery. Such separation of the sets of positive and negative plates is, however, essential in conjunction with the recovery of material making up alkaline batteries, for example those of the nickel-cadmium type, for which only manual methods, involving heavy and dirty operations, have been applicable until now.

THE INVENTION

The disadvantages exhibited by previously disclosed processes have been overcome by the present invention, which permits the disassembly of electrical storage batteries in a very good working environment providing full control of all operations and produces clean scrap which is already sorted into different types of material for subsequent processing.

This is achieved by the following steps performed in sequence in a mechanized installation: (a) removing the upper part of the cell container with its terminal posts by sawing off the top of the container, preferably immediately above the connecting straps which secure the sets of plates to each other, so as to produce an opening, (b) withdrawing the sets of plates from the cell container by means of a mechanical device, at the same time as the cell container is gripped and held fast in a predetermined position by means of clamping devices, (c) washing the sets of plates clean of any residual deposits and remaining electrolyte by means of a rinsing liquid, (d) moving apart from each other moving hook-shaped drawing devices, which have been brought into engagement with the sets of negative plates and with the sets of positive plates and (e) separating the sets of plates from each other.

The sets of plates are best withdrawn from the cell container and separated by means of pneumatically or hydraulically powered devices which may most suitably be provided with moving hooks which engage in the connecting straps.

One embodiment of the invention involves removing the upper part of the cell container—after the container has been emptied of its electrolyte in an inverted position—with the container in a horizontal position, withdrawing the sets of plates with the container in an upright position, washing the sets of plates which have been withdrawn in an upright position, inverting the sets of plates, attaching movable hook-shaped devices around the connecting straps of the sets of plates, and separating the sets of plates from each other by drawing the hook-shaped devices apart in the plane of the plates.

In another embodiment, once the plates have been separated, they are moved apart from each other sufficiently to allow the plates on being released from the hook-shaped devices to fall into one or the other of containers intended to receive the respective sets of electrode plates.

THE DRAWING

The invention is described below in greater detail in relation to the attached drawing, in which FIG. 1 shows a diagrammatic representation of the entire arrangement, FIG. 2 shows a diagram of a partly completed operation, and FIG. 3 shows the same operation completed.

DETAILED DESCRIPTION OF A PREFERRED EMBODIMENT

The reference numeral 10 on the drawing denotes scrap batteries which are emptied of their electrolyte by being inverted and placed on supporting strips in a draining vessel 11. Once the batteries have been emptied of their electrolyte, the drained batteries 12 are placed on a conveyor belt 13 and are taken to a saw 14. The batteries are forced against a stop and are held by means of pneumatic or hydraulic devices (not shown) in the position shown in the Figure, in which the upper part 16 of the battery with its terminal posts will have been moved a certain distance beyond the saw blade 15. Once the upper part has been removed, the opened battery 17 is moved into a turning device 18 in which the battery is raised in the manner indicated by the reference numeral 19 and is removed from the arrangement to a withdrawing device 20, consisting of a hydraulic or pneumatic lifting cylinder 21 with a piston rod 22. Arranged on the piston rod are two articulated gripping arms 23 and 24 which can be moved towards and away from each other by means of hydraulic cylinders 25 and 26. The arms are equipped at their lower, outer ends with outwardly facing hooks 27 and 28 so arranged as to engage with the connecting straps 29 and 30 which hold together the sets of negative and positive plates inside the battery. The sets of plates together with the connecting straps 29 and 30 form an electrode unit 31 inside the battery container 32 which has been emptied of its electrolyte.

The opened battery 17 is supported by the conveyor 13 and is held fast during the removal of the electrode unit 31 by means of two hydraulically or pneumatically powered clamping devices 33 and 34. The electrode unit 31 is lifted from the battery container 32 by the actuating cylinders 25, 26 causing the gripping arms 23 and 24 to move together, whereupon the lifting device is guided down into the upper part of the battery with the help of the piston rod 22. Once the device has reached the desired position, the hooks 27, 28 are moved outwardly by the actuating cylinders 25, 26 and engage beneath the connecting straps 29, 30. Then, with the help of the lifting cylinder 21, the entire electrode unit is lifted up and out of the battery container 32, which is removed to an arrangement designed for the purpose of cleaning and materials recovery or to a container for the collection of scrap plate. The electrode unit is moved to one side and is replaced on the conveyor 13, which advances the unit as far as a stop 35. From here, the electrode unit is taken by a transport device 36 and is introduced into a washing device consisting of an upper washing ramp 37 and a lower container 38 with a drain outlet. This operation involves washing the electrode unit 31 clean of any residual electrolyte and of any sludge and deposits which may be present in the unit.

The electrode unit 31 is moved to the right, as shown, beneath the washing ramp 37, at the end of which the unit is inverted in the manner shown by the arrow 39. The unit is then moved to a separating device 40 where the electrode unit 31 is caused to rest on two separating devices 41 and 42 having at their outer ends hooks 43 and 44 which engage the connecting straps 29 and 30 on the sets of positive or negative plates making up the electrode unit 31.

Once the electrode unit 31 with its connecting straps 29 and 30 is resting on the collars of the separating devices 41, 42, which carry the hooks 43, 44, the separating devices 41, 42 are drawn apart from each other by power sources not shown, e.g. hydraulic or pneumatic devices.

FIG. 2 shows a position in which the sets of plates 45 and 46 have been partly separated from each other.

FIG. 3 shows the final position in which the sets of plates 45, 46 have been fully separated and are hanging free from each other by their connecting straps 29 and 30. In this position the plates 45, 46 are hanging over containers 47 and 48 intended respectively to receive the sets of positive and negative plates. The sets of plates 45, 46 are released from the hooks 43 and 44 by means of a lifting or ejection device not shown, enabling them to fall freely into the containers 47, 48. In this way the containers collect sorted and clean sets of positive and negative plates. This sorting is of interest, particularly in the case of batteries with an alkaline electrolyte, such as nickel-cadmium cells, whose positive electrodes mainly contain nickel and iron, whereas the principal component of their negative electrode plates is cadmium. Cadmium is a substance which is harmful to the environment and which must be recovered partly for environmental reasons but partly also for economic reasons. Thus the sets of negative plates are taken on to an arrangement designed specifically for the recovery of cadmium, whereas the sets of positive electrode plates are in the form of iron-nickel scrap which can be delivered directly to steel works.

The typical embodiment described here shows how the present invention enables dirty, labour-intensive and, from the point of view of safety and health, dangerous and unpleasant work to be avoided by an entirely mechanical process, which also lends itself to complete automation. The work can also be carried out with full control of the environmentally hazardous materials such as the electrolyte, cadmium and cadmium containing chemical substances. The presented example illustrates the preferred process, although an expert will be able to modify the process within the scope of the following claims.

I claim:

1. A process for the disassembling of scrapped, i.e. worn out, damaged or in some other way unserviceable electric storage batteries, in particular alkaline batteries, consisting of a prismatic cell container with sets of positive and negative plates, each secured to the next by means of a connecting strap, from which terminal posts project through a cover on the upper part of the cell container, for the purpose after having emptied any free electrolyte from the cell container of recovering the materials making up the battery, characterized by the following steps performed in sequence in a mechanized installation
    (a) removing the upper part of the cell container with its terminal posts by sawing off the top of the container preferably immediately above the connecting straps which secure the sets of plates to each other, so as to produce an opening;
    (b) withdrawing the sets of plates through said opening by means of a mechanical device at the same time as the container is gripped and held fast in a pre-determined position by means of clamping devices;
    (c) washing the withdrawn sets of plates clean of any residual deposits and remaining electrolyte by means of a rinsing liquid;
    (d) bringing into engagement respectively with the sets of negative plates and the sets of positive plates hook-shaped drawing devices, and
    (e) moving the hook-shaped drawing devices apart to separate the sets of plates from each other.

2. A process according to claim 1, characterized in that in step (b) the sets of plates are withdrawn from the cell container and that in step (e) they are separated respectively by means of pneumatically or hydraulically powered devices.

3. A process according to claim 1, characterized in that the plates are withdrawn in step (b) by a drawing device having moving hooks which engage with the connecting straps.

4. A process according to claim 1, characterized in that
    the cell container is emptied of its electrolyte in an inverted position before removing the upper part of the cell;
    the upper part is removed with the cell container lying in a horizontal position;
    the sets of plates are withdrawn with the container in an upright position;
    the sets of plates which have been withdrawn are washed clean in an upright position;

the sets of plates are inverted; and the hook-shaped drawing devices are engaged around the connecting straps of the sets of plates and capable of being moved away from each other.

5. A process according to claim 4, characterized in that, after the plates have been separated, the hook-shaped devices are moved apart from each other sufficiently to allow the positive and negative plates to be released from the hook-shaped devices to fall respectively into one of two containers intended to receive the respective sets of electrode plates.

* * * * *